(No Model.)

J. D. RIGGS.
BELT DYNAMOMETER.

No. 431,077. Patented July 1, 1890.

WITNESSES
William H. Russell
C. J. Mattens

INVENTOR
John D. Riggs

United States Patent Office.

JOHN D. RIGGS, OF DAYTON, OHIO.

BELT-DYNAMOMETER.

SPECIFICATION forming part of Letters Patent No. 431,077, dated July 1, 1890.

Application filed June 1, 1889. Serial No. 312,872. (No model.)

*To all whom it may concern:*

Be it known that I, JOHN D. RIGGS, a citizen of the United States, residing at Dayton, in the county of Montgomery and State of Ohio, have invented a new and useful Belt-Dynamometer, of which the following, in connection with the accompanying drawings, is a specification.

The object of this invention is to provide an instrument suitable to measure the force being exerted by flat belts—such as are in use for driving machinery—which instrument, in connection with those now in use for measuring length and time, will enable a competent person to measure the amount of power being transmitted by such belts.

Figure 1:
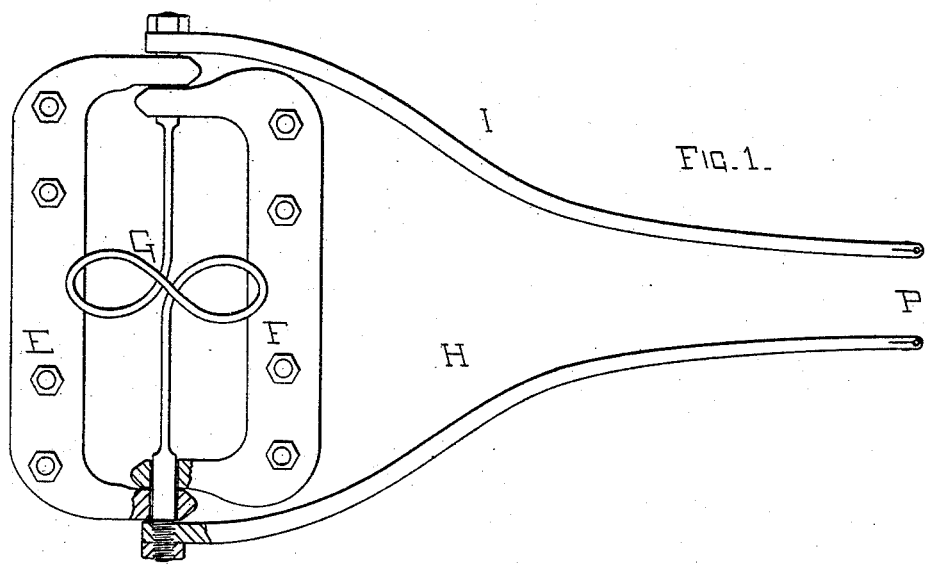
Figure 2:
Figure 3:
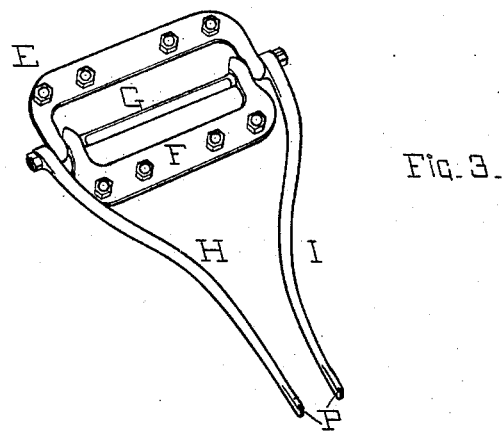

In the accompanying drawings, Figure 1 is a plan view of my new dynamometer, partly in section. Fig. 2 is the corresponding elevation with a portion of the piece H broken away. Fig. 3 is a perspective view showing a simpler form of spring G than that shown in Figs. 1 and 2.

I find it desirable to construct various sizes of instruments for the numerous widths of belts. For example, one instrument for belts from four to six inches in width and another for belts from six to nine inches in width.

Similar letters refer to similar parts throughout.

The part E is adapted to be fastened to the belt by means of bolts or other suitable fastenings, and to connect with the spring G by means of a special form of bearing. The part F is similar to the part E, but has its bearings on the spring G between those of E. The bearings of the parts E and F are formed by drilling a round hole slightly larger than the cylindrical portion of the spring G, then with a suitable tool counterbore each hole from each end, leaving only an annular knife-edge to form the bearing-surface, as shown in the sectional portion of Fig. 1.

The part G is a spring having a threaded portion at each end and a smooth cylindrical portion where it is inclosed by parts E and F. The remaining central part of the part G is flattened and is the spring proper. For the larger sizes this portion is nearly straight, but for smaller sizes a central loop, as shown in Figs. 1 and 2, is used.

H and I are arms which are rigidly attached to the part G by means of being threaded and having a lock-nut, and which carry pencils P at their free ends. The parts E, F, and G are preferably made of steel and hardened.

The manner of using this instrument is as follows: Remove the lacing from the belt and attach the part E to one end and the part F to the other. It will be seen that an increase in the tension of the belt will cause a corresponding increase in the distance between the pencil-points P. The belt may now be put on its pulleys and set in motion, doing the work which it is desired to measure. A tablet of paper may now be held near the belt and lines drawn on it. If a tablet is so held alternately on the straight portions between the pulleys, the difference of the distance between the lines so drawn will indicate the force being exerted. The speed of the belt may be measured in any convenient way. The dynamometer may now be removed from the belt and suspended by the part E, and a weight attached to F sufficient to spread the pencil-points the same distance apart as when running on the slack side of the belt, and an additional weight sufficient to spread them to the distance they were when running on the tight side of the belt. This additional weight must be equal to the useful force exerted by the belt while in motion, and may be multiplied by the distance traveled per minute to give the work done.

I am aware that springs have been inserted in the ropes for towing boats and in drawing loads on land, but not aware of any case in which such springs recorded the force on a stationary piece in order to adapt it to a high speed.

I claim as my invention—

1. In a belt-dynamometer, the combination of a flexible spring G, provided with projecting arms H and I, and recording-pencil points P P', for the purpose described and shown.

2. As a new article of manufacture, the above-described belt-dynamometer, consisting of the parts E and F, provided with annular knife-edge bearings, the spring G, and pencil-arms H and I, substantially as set forth.

JOHN D. RIGGS.

Witnesses:
WILLIAM H. RUSSELL,
C. J. MATLEW.